(12) United States Patent
Bravi et al.

(10) Patent No.: US 8,699,875 B2
(45) Date of Patent: Apr. 15, 2014

(54) DISPERSION MEASUREMENT SYSTEM AND METHOD IN AN OPTICAL COMMUNICATION NETWORK

(75) Inventors: Emilio Bravi, Dublin (IE); Giuseppe Tali, Dublin (IE); David McDonald, Dublin (IE); Michael Todd, Dublin (IE); David Bernard, Dublin (IE)

(73) Assignee: Intune Networks Limited, Dublin (IE)

( * ) Notice: Subject to any disclaimer, the term of this patent is extended or adjusted under 35 U.S.C. 154(b) by 0 days.

(21) Appl. No.: 13/810,957

(22) PCT Filed: Jul. 19, 2011

(86) PCT No.: PCT/EP2011/062391
§ 371 (c)(1),
(2), (4) Date: Mar. 7, 2013

(87) PCT Pub. No.: WO2012/010614
PCT Pub. Date: Jan. 26, 2012

(65) Prior Publication Data
US 2013/0156421 A1    Jun. 20, 2013

Related U.S. Application Data

(60) Provisional application No. 61/365,543, filed on Jul. 19, 2010.

(30) Foreign Application Priority Data

Jul. 19, 2010  (EP) .................................... 10170054

(51) Int. Cl.
*G01N 21/41*    (2006.01)
*H04B 10/07*    (2013.01)
*H04B 17/00*    (2006.01)
*G01N 21/84*    (2006.01)

(52) U.S. Cl.
USPC ........... 398/29; 398/28; 398/1; 398/9; 398/25

(58) Field of Classification Search
USPC ............................................ 398/9, 25–26, 29
See application file for complete search history.

(56) References Cited

U.S. PATENT DOCUMENTS 4,984,884 A * 1/1991 Ryu et al. ..................... 356/73.1
5,406,368 A * 4/1995 Horiuchi et al. .............. 356/73.1
5,909,297 A * 6/1999 Ishikawa et al. .............. 398/198

(Continued)

FOREIGN PATENT DOCUMENTS

EP    1265062    12/2002

*Primary Examiner* — Oommen Jacob
(74) *Attorney, Agent, or Firm* — Occhiuti & Rohlicek LLP

(57) ABSTRACT

The invention relates to a system and method of dispersion measurement in an optical fiber network. The invention provides means for transmitting from a transmitting node, using a single tunable laser transmitter, two consecutive bursts of data at different wavelengths $\lambda 1$ and $\lambda 2$ to a receiver node, wherein each burst of data comprises a unique sequence of amplitude modulated data, and wherein the two sequences are injected with a fixed known delay. The delay between the two consecutive bursts of data is maintained by selective switching of the tunable laser, such that clock recovery circuitry at the receiver node remains locked during the delay between the two bursts. The dispersion measurements method of the present invention is based on walk off and bit position detection between two wavelengths suitable for fast optical burst switching network is described. This method does not require an operator, extra equipment, or traffic interruption on the network.

15 Claims, 3 Drawing Sheets

(56) References Cited

U.S. PATENT DOCUMENTS

| | | | |
|---|---|---|---|
| 5,969,806 A * | 10/1999 | Bergano | 356/73.1 |
| 6,870,629 B1 * | 3/2005 | Vogel et al. | 356/519 |
| 6,912,046 B2 * | 6/2005 | Brendel | 356/73.1 |
| 7,035,538 B2 * | 4/2006 | Willner et al. | 398/29 |
| 7,197,242 B2 * | 3/2007 | Sasaoka | 398/29 |
| 2003/0067975 A1 * | 4/2003 | Yamakura et al. | 375/233 |
| 2003/0142293 A1 | 7/2003 | Wight et al. | |
| 2004/0130704 A1 * | 7/2004 | Beller et al. | 356/73.1 |
| 2007/0018635 A1 * | 1/2007 | Nebendahl | 324/158.1 |
| 2008/0144016 A1 * | 6/2008 | Lewis et al. | 356/73.1 |

* cited by examiner

DISPERSION MEASUREMENT SYSTEM AND METHOD IN AN OPTICAL COMMUNICATION NETWORK

CROSS-REFERENCE TO RELATED APPLICATIONS

This application is the National Stage of International Application No. PCT/EP2011/062391, filed on Jul. 19, 2011, which claims the priority of U.S. Application No. 61/365,543, filed on Jul. 19, 2010 and EP Application No. 10170054.0, filed on Jul. 19, 2010. The contents of these applications are hereby incorporated by reference in their entirety.

FIELD OF THE INVENTION

The invention relates to a dispersion measurement system and method in an optical communication network. In particular the invention relates to a dispersion measurement system and method in an Optical Burst Switch (OBS) network

BACKGROUND TO THE INVENTION

In optical communication systems, the light generated by a laser is used to represent the digital data bits "1" and "0". Normally, a pulse of light represents "1" and the absence of light represents "0". The bit rate is the speed at which these bits are transmitted. The temporal width of the light pulses must not exceed the bit time interval to avoid ISI (inter symbol interference).

Fibre dispersion is a phenomenon in which the spectral components of the light propagate through the fibre at different velocities due to the wavelength dependent refractive index. The effect on a pulse of light is a spreading in time that may lead to exceed the bit rate and thus to ISI (inter symbol interference). Unless dispersion is properly managed, dispersion can limit both the bit rate and the reach of an optical telecommunication system.

Managing dispersion comprises two steps. The first is measuring the dispersion and the second is compensating for the amount of dispersion measured. If the optical signal comprises two pulses, each one on a distinct wavelength, then each pulse will travel at different speed. Therefore, at the end of fibre, the dispersion causes:

1. a broadening of each of the pulses
2. a relative delay $\Delta t$ between the two pulses carried by two different wavelength The delay $\Delta t$, referred to as Walk-off, is proportional to dispersion and wavelength separation $\Delta \lambda$:

$$D \cdot L = \frac{\Delta t}{\Delta \lambda} \quad (1)$$

where D is the dispersion coefficient of the fibre (measured in ps/nm km) and L is the length of the fibre.

Typical values are $\Delta\lambda=35$ nm and $\Delta t=50$ ns. Therefore, the typical D·L value is about 1400 ps/nm corresponding to a fibre dispersion coefficient D=17 ps/nm/km and a fibre length L=80 km.

From the measurement of the relative delay $\Delta t$ at the other end of the fibre and by knowing the wavelengths employed in the measurement (and therefore $\Delta\lambda$) the cumulated dispersion D·L, can be calculated by formula (1).

Using the walk-off effect as a method to measure dispersion is already known in the art as the "pulse-delay method", such as that disclosed in U.S. Pat. No. 5,969,806, assigned to Tyco Submarine Systems Inc. This method measures differential delay between optical pulses launched at different wavelengths, using a multiple-wavelength transmitter at one end of the fibre and a photodiode and oscilloscope at the other end.

One way to implement the "pulse-delay method" is to have a bank of lasers that can be activated from a single pulse generator. A first laser wavelength is used as the reference time delay (given a relative group delay of zero) and the other wavelengths' transmission times are compared against this reference time (FOTP-168). However, this method suffers from a number of problems in deployed communication networks, namely:

requires at least two lasers and a single pulse generator;
requires a dedicated receiver and an oscilloscope;
requires operator interaction to control the process;
involves fibre disconnection/reconnection or dedicated taps and filters to connect the receiver
affects pre-existing traffic or prolongs time to go into service.

Another method is disclosed in US Patent Publication number US2003/142293, Wight et al, for measuring dispersion of a link between two switching nodes in an optical network. The method described is complex and difficult to implement as it requires extra dedicated hardware and affects traffic performance on the network. Wight requires use of four full transponders: three transmitters and four receivers, with bidirectional transmission between the measurement nodes. This is because the timing reference cannot be maintained in the switch between lambda1 and lambda2. The consequence is that an extra wavelength is necessary first to transmit the clock reference from a location B to a location A, and then the clock reference, used at location A to time the signals of lambda1 and lambda2, needs to be retransmitted to location B in order to measure the phase difference with lambda1 and lambda2 signals. The method disclosed in Wight also requires synchronisation and communication of data between two transponders or the use of a third separate module to measure the phase difference and calculate the dispersion.

There is therefore a need to provide a simple and more efficient solution to the problem of measuring dispersion in a deployed and operational optical communication network.

SUMMARY OF THE INVENTION

According to the invention there is provided, as set out in the appended claims, a method of dispersion measurement in an optical fibre network, said network comprising at least first and second nodes connected by a length of optical fibre, the method comprising the steps of:

(a) setting the second node such that a single receiver can receive at least two different wavelengths $\lambda 1$ and $\lambda 2$;

(b) transmitting from the first node, using a single tunable laser transmitter, two consecutive bursts of data at different wavelengths $\lambda 1$ and $\lambda 2$, wherein each burst of data comprises a unique sequence of amplitude modulated data, and wherein the two sequences are injected with a fixed known delay;

(c) maintaining a delay between the two consecutive bursts of data by selective switching of the tunable laser, such that clock recovery circuitry at the receiver node remains locked during the delay between the two bursts;

(d) receiving at the second node the two consecutive bursts of data;

(e) measuring the relative delay between the two unique sequences of data each one contained in one of the received bursts of data; and
(f) calculating the dispersion of the optical fibre from one or more of the following: the measured relative delay, the fixed known delay, the length of the fibre and the at least two different wavelengths.

The method and system of the present invention only requires one transmitter and one receiver and unidirectional transmission between the nodes in order to measure the dispersion, which provides a simpler and more efficient solution to existing systems. The core of the proposed method is measuring of an injected known delay and walk off delay ($T_0+\Delta t$) by using the equipment already installed in an optical burst switching network, namely the above-mentioned single transmitter and single receiver. In fact, the particular characteristics of optical burst switching transmitter and receiver allows to set the initial delay between the unique sequences $T_0$ and to measure $T_0+\Delta t$ with a precision equal to the duration of 1 clock period (indicated as quantisation error).

Therefore, the dispersion measurement method of the present invention is based on walk off delay and a simple bit position detection between two consecutive bursts received by the same receiver.

The method advantageously does not require an operator, extra equipment, or traffic interruption. The invention does not involve fibre disconnection/reconnection or dedicated taps and filters. In addition the invention allows a plug and play configuration of the dispersion compensating components based on an insitu dispersion measurement method.

In one embodiment the method further comprises repeating steps (a) to (f) a number of times such that any errors introduced at the bit level during said measurements is averaged out. By repeating the measurement a sufficient number of times the quantisation error introduced at the bit level on the walk off ($\Delta t$) measurement can be averaged out.

In one embodiment the step of calculating the dispersion uses the formula:

$$D \cdot L = \frac{\Delta t}{\Delta \lambda}$$

wherein where D is the dispersion coefficient of the fibre (measured in ps/nm km); L is the length of the fibre, $\Delta\lambda$ is the wavelength separation and $\Delta t$ is the measured relative delay minus the fixed delay.

In one embodiment the step of measuring the dispersion is repeated for various wavelengths $\lambda 1$ and $\lambda 2$ across the band of the optical fibre used in the network, such that the slope of the dispersion can be measured as a function of the wavelength.

In one embodiment the unique sequence of bits allows a specific field in a transmitted burst to be detected in time with bit level accuracy (1 clock period).

In one embodiment said unique sequence of bits starts after a known number of clock periods at said first node. The relative delay measured at said second node can be calculated in the number of clock periods.

In one embodiment clock recovery circuitry at said receiver node remains locked during the delay (or gaps) between said two consecutive bursts of data.

In one embodiment the method comprises the further step of tuning a laser at the transmitter node to transmit a wavelength that can only be detected by the receiver node.

In one embodiment the Optical Burst Switching fibre network is a ring network.

In a further embodiment there is a provided a system in an Optical Burst Switching fibre network, said network comprising at least two nodes connected by an optical fibre, the system comprising:
  means for setting the second node such that a receiver can receive at least two different wavelengths $\lambda 1$ and $\lambda 2$;
  means for transmitting from the first node two consecutive bursts of data at different wavelengths $\lambda 1$ and $\lambda 2$, wherein each burst of data comprises a unique sequence of amplitude modulated data, and wherein the two sequences are injected with a fixed known delay; means for receiving at the second node the two consecutive bursts of data;
  means for measuring the relative delay between the two unique sequences of data each one contained in one of the received bursts of data;
  means for calculating the dispersion of the optical fibre from one or more of the following: the measured relative delay, the fixed known delay, the length of the fibre and the at least two different wavelengths.

In another embodiment of the present invention there is a provided a system in an Optical Burst Switching fibre network, said network comprising a transmitter node and a receiver node connected by an optical fibre, the system comprising:
  means for transmitting from the transmitter node two consecutive bursts of data at different wavelengths, using a single tunable laser transmitter, wherein each burst of data comprises a unique sequence of bits;
  means for maintaining a delay between the two consecutive bursts of data by selective switching of the tunable laser, such that clock recovery circuitry at the receiver node remains locked during the delay between the two bursts;
  means for receiving at the receiver node the two consecutive bursts of data, such that clock synchronisation is maintained between the two bursts; means for measuring the delay between the two received consecutive bursts of data to provide a relative delay;
  means for measuring the difference in wavelength values to provide a wavelength separation; and
  means for calculating the dispersion of the optical fibre from the measured relative delay and the wavelength separation.

In a further embodiment of the present invention there is provided a method of dispersion measurement in a network, said network comprising at least two nodes connected by a length of optical fibre, the method comprising the steps of:
  (a) setting the second node such that a receiver can receive at least two different wavelengths $\lambda 1$ and $\lambda 2$;
  (b) transmitting from the first node two consecutive bursts of data at different wavelengths $\lambda 1$ and $\lambda 2$, wherein each burst of data comprises a unique sequence of amplitude modulated data, and wherein the two sequences are injected with a fixed known delay;
  (c) receiving at the second node the two consecutive bursts of data;
  (d) measuring the relative delay between the two unique sequences of data each one contained in one of the received bursts of data;
  (e) calculating the dispersion of the optical fibre from one or more of the following: the measured relative delay, the fixed known delay, the length of the fibre and the at least two different wavelengths.

In yet another embodiment of the invention there is provided a system for dispersion measurement in an optical network, said network comprising a transmitter node and a receiver node connected by an optical fibre, the system comprising:

means for transmitting from the transmitter node two consecutive bursts of data at different wavelengths using a single tunable laser transmitter, wherein each burst of data comprises a unique sequence of bits;

means for maintaining a delay between the two consecutive bursts of data by selective switching of the tunable laser, such that clock recovery circuitry at the receiver node remains locked during the delay between the two bursts;

means for calculating the dispersion.

In a further embodiment there is provided a method for dispersion measurement in an optical network, said network comprising a transmitter node and a receiver node connected by an optical fibre, the method comprising:

transmitting from the transmitter node two consecutive bursts of data at different wavelengths using a single tunable laser transmitter, wherein each burst of data comprises a unique sequence of bits;

maintaining a delay between the two consecutive bursts of data by selective switching of the tunable laser, such that clock recovery circuitry at the receiver node remains locked during the delay between the two bursts; and calculating the dispersion from the transmitted bursts.

There is also provided a computer program comprising program instructions for causing a computer program to carry out the above method which may be embodied on a record medium, carrier signal or read-only memory.

BRIEF DESCRIPTION OF THE DRAWINGS

The invention will be more clearly understood from the following description of an embodiment thereof, given by way of example only, with reference to the accompanying drawings, in which.

DETAILED DESCRIPTION OF THE DRAWINGS

Figure 1:
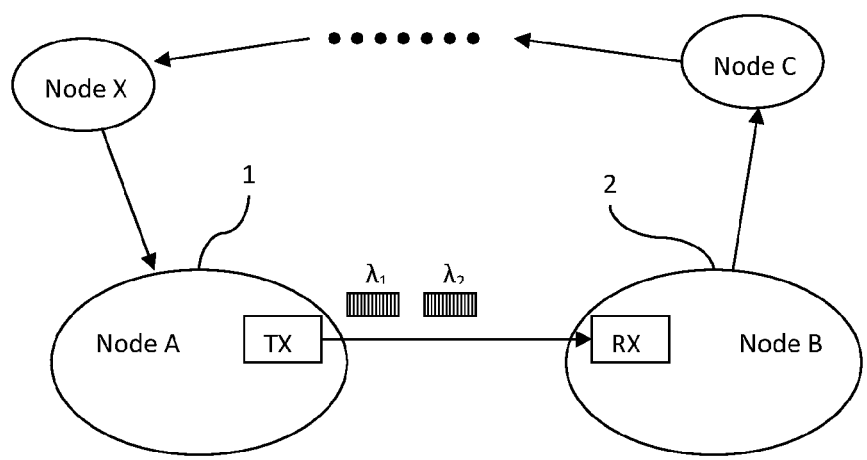
FIG. 1 illustrates two nodes in an optical ring network.

Referring now to the Figures and initially FIG. 1, FIG. 1 shows an optical communication network, for example an Optical Burst Switching (OBS) fibre network comprising at least two nodes (1 and 2) connected by a length of optical fibre for example arranged in a ring network. In a typical optical burst switched network the transmit wavelength of a channel is chosen to route to a certain destination. A fast tuneable laser (not shown) in a transmitting node 1 is tuned to a wavelength that can be detected only by a receiving node 2. The transmitting node 1 sends two consecutive bursts at appropriate wavelengths that can both be received by the receiver node 2 by appropriate filtering. Optical Burst Switching networks employ transmitter and receivers that have particular characteristics. The transmitter has the tuneable laser capable of switching from a generic wavelength $\lambda1$ to any other wavelength $\lambda2$ in a period of time of the order of hundred nanoseconds. The receiver is capable to synchronise its local clock with the data of the incoming burst in a period of time of hundreds of nanoseconds. Moreover, the receiver clock stays locked with the data even if no data is received for a period of time of several hundreds of nanoseconds. In other words the delay (or gap) between the two consecutive bursts of data transmitted is maintained by selective switching of the tunable laser, such that clock recovery circuitry at the receiver node remains locked during the delay between the two bursts.

Figure 2:
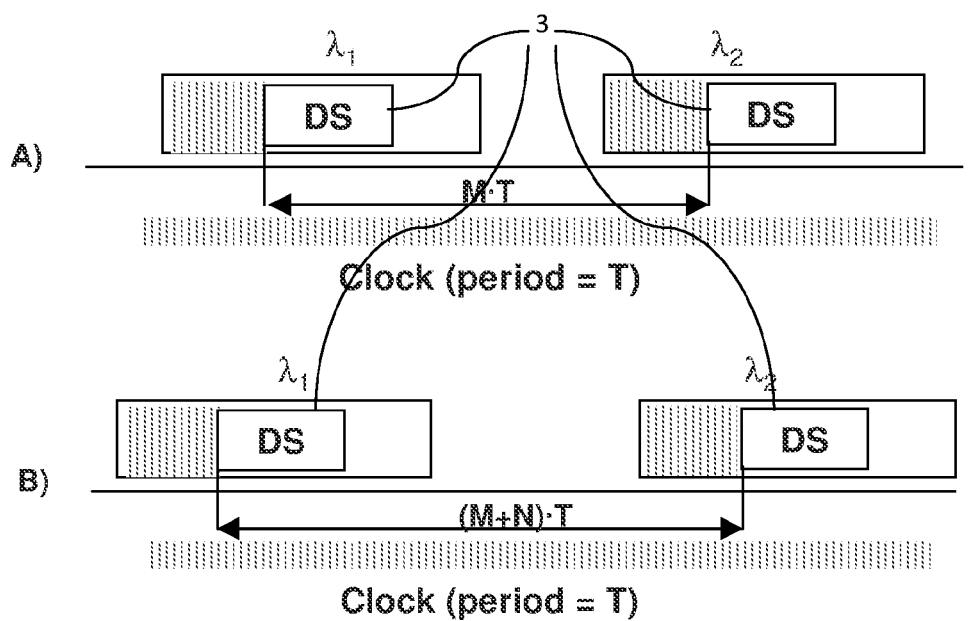
FIG. 2 illustrates burst header timing at the transmitter node (A) and at the receiver node (B) of FIG. 1.

FIG. 2 illustrates burst header timing at the transmitter node and at the receiver node of FIG. 1. The two bursts, on two different wavelengths $\lambda1$ and $\lambda2$, contain a unique sequence of bits, indicated by numeral 3, that allows a specific field in a transmitted burst to be detected in time with bit level accuracy, as shown in FIG. 2A. If Br is the bit rate and T=1/Br is the clock period, the two sequences should start after a known number of clock periods, referred to as N. The position of the sequence within a burst is not important and can vary provided it remains within the payload, but is always known a priori by the transmitter. In this way, the initial delay between the two sequences is known and equal to N×T with accuracy equal to T.

At the receiving node 2, the sequences in the two bursts are identified and the delay between them calculated in terms of number of clock periods, as illustrated in FIG. 2b. It is important to note that a fast tuneable laser can send consecutive bursts with a relative delay between bursts in the order of 100 ns, which is advantageously chosen, as outlined next. Due to the short period (or delay) between the transmitted bursts (at $\lambda1$ and $\lambda2$) being well within the hold time for the receiver node burst mode PLL, the clock recovery circuitry at the receiver mode remains locked during the delay or gap between the two bursts. The delay between the two consecutive bursts of data is maintained by selective switching of the tunable laser. This ensures that there are no bit slips in the receiving decision threshold circuitry from burst to burst, allowing relative timing between bursts to be maintained. A timer at the receiver is clocked with this and counts the number of bits periods from when the first bit sequence has been received until when the second sequence arrives.

If the two received sequences have a delay of (N+M)×T, being N×T the initial delay and M×T the additional delay due to dispersion, with an accuracy equal to the bit period T, the relative delay $\Delta t$ can be calculated as the difference between these measurements and equal to M×T.

It will be appreciated that the data stream between the two bursts of different wavelength is contiguous at the transmitter, with the additional time delay at the receiver on the position of the marker (or unique sequence) due to fibre dispersion between the chosen measurement wavelengths switched in the transmitter by the tuneable laser. This gives an unambiguous measure of the dispersion of the optical path without the need for nulling the clock reference difference, which would be required if two transmitters are used, and the implicit data channel continuity ensures consistency of this estimate.

The measurements can be repeated several times, in different periods of time, and averaged to increase the accuracy of the measurements.

Having measured $\Delta t$ and knowing the wavelength separation $\Delta \lambda$ the cumulated dispersion of the fibre D·L can be calculated using formula:

$$D \cdot L = \frac{\Delta t}{\Delta \lambda}$$

wherein D is the dispersion coefficient of the fibre (measured in ps/nm km); L is the length of the fibre, $\Delta \lambda$ is the wavelength separation and $\Delta t$ is the measured relative delay minus the fixed delay.

The measurement of the dispersion can be repeated for various wavelengths λ1 and λ2 across the band of the optical fibre used in the network, such that the slope of the dispersion can be measured as a function of the wavelength.

Figure 3:
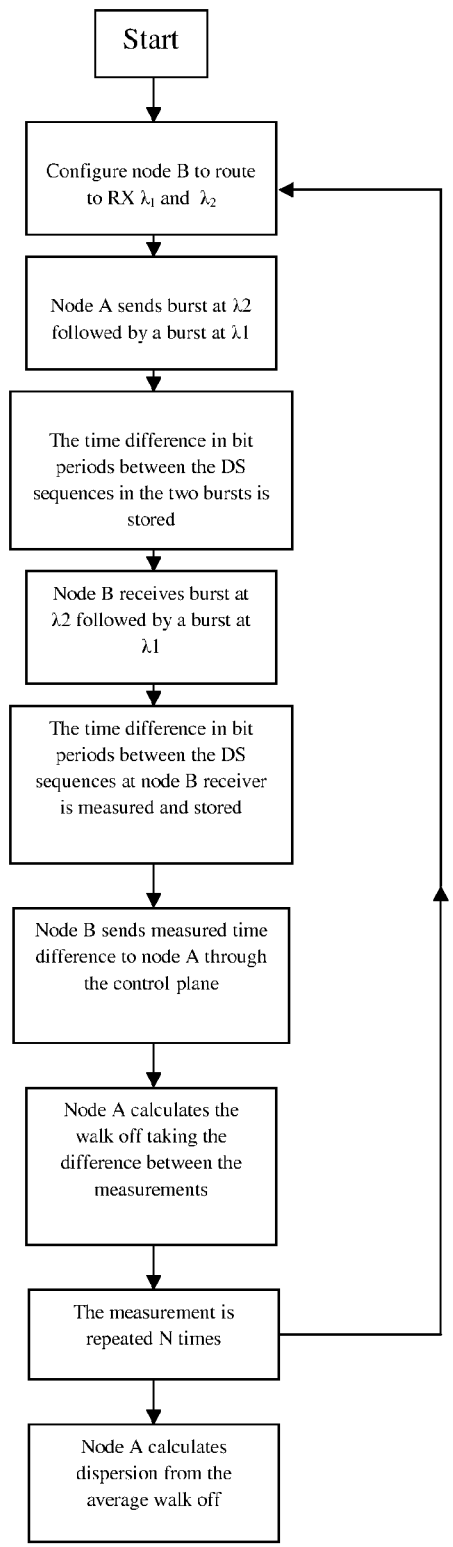
FIG. 3 is a flow chart illustrating the dispersion measurement according to the invention.

FIG. 3 describes a flowchart illustrating operation of the method of the invention. Node 1 sends burst at λ2 followed by a burst at λ1. The time difference in bit periods between the unique sequences of bits (DS) in the two bursts is stored. Node 2 receives burst at λ2 followed by a burst at λ1. The time difference in bit periods between the unique sequences of bits at Node 2 receiver is measured and stored. In one embodiment, Node 2 sends measured time difference to Node 1 through a control plane. Node 1 then calculates the walk off taking the difference between the measurements.

In another embodiment, the transmit time difference is fixed and known to all nodes. The node 2 can then calculated walk-off by itself and transmit it to the other nodes. As shown in FIG. 3 the walk off measurement can be optionally repeated multiple times and averaged. This improves the measurement accuracy since the phase alignment of the data in the two burst with the RX clock changes between the various measurements. If the measurement is repeated a sufficient number of times the quantisation error introduced at the bit level on the walk off measurement can be averaged out. Node 1 calculates dispersion from the average walk off. The reduction of the error due to the quantisation in the walk off measurement translates in an improvement of the dispersion measurement.

Figure 4:
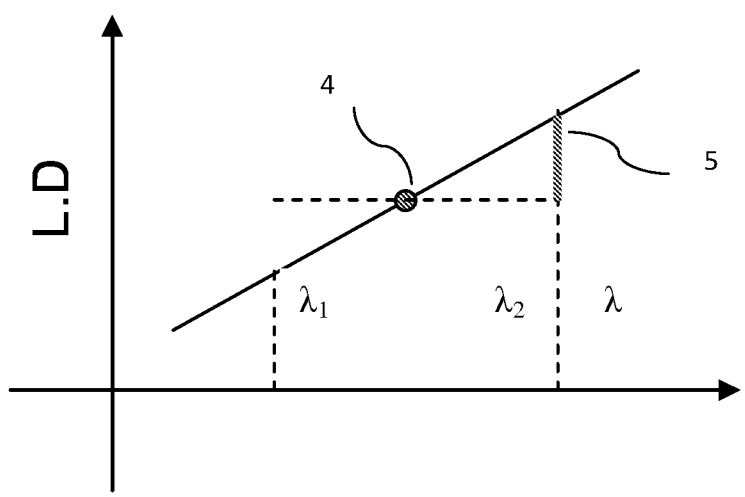
FIG. 4 illustrates the difference between the measured dispersion and the value at a particular wavelength.

From FIG. 4 it can be seen that a source of measurement uncertainty is due to the difference between the dispersion value at one of the wavelengths used in the measurement and the value measured which is the average between the values (4) at the two measurement wavelength, $\lambda_1$ and $\lambda_2$. Assuming that the dispersion slope is not known before the measurement (particularly in the case of unknown fibre type), there will be an extra uncertainty on the value at $\lambda_2$.

A large wavelength separation between $\lambda_1$ and $\lambda_2$ would give the smallest error since the delay introduced is maximised. However a large separation would introduce a larger uncertainty on the dispersion slope. In order to be able to measure accurately the dispersion slope there is an optimum value of the wavelength separation, in a further aspect of the invention.

Assuming that there might be plus or minus a bit error, $\epsilon_T$, in the measurement of the delay $$(D \cdot L)_{meas} = \frac{\Delta t + \epsilon_T}{\Delta \lambda} = D \cdot L + \frac{\epsilon_T}{\Delta \lambda} \quad (2)$$

The total error on the measurement of D·L, taking into account the difference between the value at $\lambda_2$ and the average value measured (5), will be $$\epsilon_{LD} = (D \cdot L)_{\lambda_2} - (D \cdot L)_{meas} \quad (3)$$

$$= \frac{L \cdot S_0}{4}(\lambda_2 - \lambda_0) - \frac{L \cdot S_0}{8}(\lambda_2 - \lambda_0) - \frac{L \cdot S_0}{8}(\lambda_1 - \lambda_0) - \frac{\epsilon_T}{\Delta \lambda}$$

$$= \frac{L \cdot S_0}{8}(\lambda_2 - \chi_0 - \lambda_1 + \chi_0) - \frac{\epsilon_T}{\Delta \lambda}$$

$$= \frac{L \cdot S_0}{8} \Delta \lambda - \frac{\epsilon_T}{\Delta \lambda}$$

with $S_0$ the dispersion slope of the fibre.

The total error $\epsilon_{LD}$ depends on the wavelength spacing $\Delta \lambda$, and a minimum of the error can be found for $$\frac{d\epsilon_{LD}}{d(\Delta \lambda)} = \frac{L \cdot S_0}{8} + \frac{\epsilon_T}{(\Delta \lambda)^2} = 0, \quad (4)$$

$$\Delta \lambda = \sqrt{-\epsilon_T \frac{8}{L \cdot S_0}} = \sqrt{|\epsilon_T| \frac{8}{L \cdot |S_0|}}, \quad (5)$$

remembering that $\epsilon_T$ and $S_0$ can be positive or negative.

An optimum value of the wavelength separation can be given by equation (5) and depends on the error of the walk-off delay $\Delta t$, on the dispersion slope of the fibre $S_0$ and the fibre length L. An estimate, for a bit period of 88.5 ps and 40 km of standard single mode fibre gives an optimum wavelength separation of $$\Delta \lambda \approx \sqrt{88.5(\text{ps}) \frac{8}{40(\text{km}) \cdot 0.2(\text{ps/km nm}^2)}} = 9.4 \text{ nm} \quad (6)$$

It will be further appreciated that the dispersion method and system of the present invention can be executed without affecting traffic as the measurement requires no additional test equipment. The only requirement is that two dispersion measurement bursts are scheduled to a single Rx. This can be achieved, for example, by using a temporary wavelength assignment during node addition.

The embodiments in the invention described with reference to the drawings comprise a computer apparatus and/or processes performed in a computer apparatus. However, the invention also extends to computer programs, particularly computer programs stored on or in a carrier adapted to bring the method of invention into practice. The program may be in the form of source code, object code, or a code intermediate source and object code, such as in partially compiled form or in any other form suitable for use in the implementation of the method according to the invention. The carrier may comprise a storage medium such as ROM, e.g. CD ROM, or magnetic recording medium, e.g. a floppy disk or hard disk. The carrier may be an electrical or optical signal which may be transmitted via an electrical or an optical cable or by radio or other means.

In the specification the terms "comprise, comprises, comprised and comprising" or any variation thereof and the terms include, includes, included and including" or any variation thereof are considered to be totally interchangeable and they should all be afforded the widest possible interpretation and vice versa.

The invention is not limited to the embodiments hereinbefore described but may be varied in both construction and detail.

The invention claimed is:

1. A method of dispersion measurement in an optical fibre network, said network comprising at least first and second nodes connected by a length of optical fibre, the method comprising the steps of:
    (a) setting the second node such that a single receiver can receive at least two different wavelengths λ1 and λ2;
    (b) transmitting from the first node, using a single tunable laser transmitter, two consecutive bursts of data at different wavelengths λ1 and λ2, wherein each burst of data comprises a unique sequence of amplitude modulated data that comprises a unique sequence of bits that allows a specific field in a transmitted burst to be detected in time by the receiver, and wherein the two sequences of amplitude modulated data are injected with a fixed known delay;

(c) maintaining a delay between the two consecutive bursts of data by selective switching of the tunable laser;

(d) receiving at the second node the two consecutive bursts of data;

(e) measuring a relative delay between the two sequences of amplitude modulated data each one contained in one of the received bursts of data;

(f) calculating the dispersion of the optical fibre from the measured relative delay and one or more of the following: the fixed known delay, the length of the optical fibre and the at least two different wavelengths.

2. The method of claim 1 wherein the optical fibre network is an optical burst switching fibre network.

3. The method of claim 1 comprising repeating steps (a) to (f) a number of times such that errors due to the bit level accuracy that affects said measurements is averaged out.

4. The method of claim 1 wherein the measured relative delay comprises the injected fixed known delay and a walk off delay ($\Delta t$).

5. The method of claim 1 wherein the step of calculating the dispersion uses the formula:

$$D \cdot L = \frac{\Delta t}{\Delta \lambda}$$

wherein D is the dispersion coefficient of the fibre (measured in ps/nm km); L is the length of the fibre, $\Delta\lambda$ is the wavelength separation between $\lambda 1$ and $\lambda 2$, and $\Delta t$ is the measured relative delay minus the injected fixed known delay.

6. The method of claim 1 wherein the step of measuring the dispersion is repeated for various wavelengths $\lambda 1$ and $\lambda 2$ across the band of the optical fibre used in the network, such that the slope of the dispersion can be measured as a function of the wavelength.

7. The method of claim 1 wherein the unique sequence of bits comprises a unique number of bits.

8. The method of claim 1 wherein said unique sequence of amplitude modulated data starts after a known number of clock periods at said first node.

9. The method of claim 8 wherein the relative delay measured at said receiver node is calculated in the known number of clock periods.

10. The method of claim 1 wherein the clock recovery circuitry at said receiver node remains locked during the delay between said two consecutive bursts of data.

11. The method as claimed in claim 1 further comprising the step of tuning a laser at the transmitter node to transmit a wavelength that can only be detected by the receiver node.

12. The method as claimed in claim 2 wherein the optical burst switching fibre network is a ring network.

13. A system for dispersion measurement in an optical network, said network comprising a transmitter node and a receiver node connected by an optical fibre, the system comprising:

means for transmitting from the transmitter node two consecutive bursts of data at different wavelengths using a single tunable laser transmitter, wherein each burst of data comprises a unique sequence of bits that allows a specific field in a transmitted burst to be detected in time by the receiver node;

means for maintaining a delay between the two consecutive bursts of data by selective switching of the tunable laser;

means for receiving at the receiver node the two consecutive bursts of data such that clock synchronization is maintained between the two bursts;

means for measuring the delay between the two received consecutive bursts of data to provide a relative delay;

means for setting the difference in wavelength values to provide a wavelength separation; and means for calculating the dispersion of the optical fibre from the measured relative delay and the wavelength separation.

14. The system as claimed in claim 13 wherein the optical network is an optical burst switching fibre network.

15. The system as claimed in claim 14 wherein the optical burst switching fibre network is a ring network.

\* \* \* \* \*